(12) United States Patent
Seo et al.

(10) Patent No.: US 9,276,662 B2
(45) Date of Patent: Mar. 1, 2016

(54) METHOD AND APPARATUS FOR HANDING OVER MOBILE CELL

(75) Inventors: Hanbyul Seo, Anyang-si (KR);
Hakseong Kim, Anyang-si (KR);
Byounghoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 232 days.

(21) Appl. No.: 14/004,576

(22) PCT Filed: Mar. 26, 2012

(86) PCT No.: PCT/KR2012/002182
§ 371 (c)(1),
(2), (4) Date: Sep. 11, 2013

(87) PCT Pub. No.: WO2012/134131
PCT Pub. Date: Oct. 4, 2012

(65) Prior Publication Data
US 2014/0003327 A1 Jan. 2, 2014

Related U.S. Application Data

(60) Provisional application No. 61/468,545, filed on Mar. 28, 2011.

(51) Int. Cl.
| | | |
|---|---|---|
| H04B 7/185 | (2006.01) | |
| H04W 36/08 | (2009.01) | |
| H04W 36/32 | (2009.01) | |
| H04W 84/00 | (2009.01) | |
| H04W 88/04 | (2009.01) | |

(52) U.S. Cl.
CPC ........... *H04B 7/18541* (2013.01); *H04W 36/08* (2013.01); *H04W 36/32* (2013.01); *H04W 84/005* (2013.01); *H04W 88/04* (2013.01)

(58) Field of Classification Search
CPC ... H04W 88/04; H04W 88/005; H04W 36/32; H04W 36/08; H04B 7/18541
See application file for complete search history.

(56) References Cited

U.S. PATENT DOCUMENTS

| | | | |
|---|---|---|---|
| 2008/0227434 A1 | 9/2008 | Nitta et al. | |
| 2012/0082084 A1* | 4/2012 | Balakrishnan | H04W 72/1215 370/315 |
| 2012/0140700 A1* | 6/2012 | Huang | H04W 36/12 370/315 |
| 2012/0322449 A1* | 12/2012 | Shimizu | H04W 36/24 455/436 |
| 2013/0059585 A1* | 3/2013 | Giloh | H04L 45/54 455/436 |
| 2013/0183971 A1* | 7/2013 | Tamaki | H04W 36/0061 455/436 |

FOREIGN PATENT DOCUMENTS

| | | |
|---|---|---|
| JP | 2000253438 A | 9/2000 |
| WO | 2011/030862 A1 | 3/2011 |

* cited by examiner

*Primary Examiner* — Ajay Cattungal
(74) *Attorney, Agent, or Firm* — Dentons US LLP

(57) ABSTRACT

The present invention relates to a wireless communication system, and more particularly, to a method and an apparatus for performing a handover related to a mobile cell. A method for a user equipment handing over a mobile relay, according to one embodiment of the present invention, can comprise a step of reporting to a serving base station information on the state of the user equipment with respect to the mobile relay handover, and a step of handing over the mobile relay based on a handover command by the serving base station, the handover being determined based on the state of the user equipment. As a result, a way for efficiently and accurately performing the handover related to the mobile cell can be provided.

10 Claims, 11 Drawing Sheets

(a)

(b)

FIG. 5
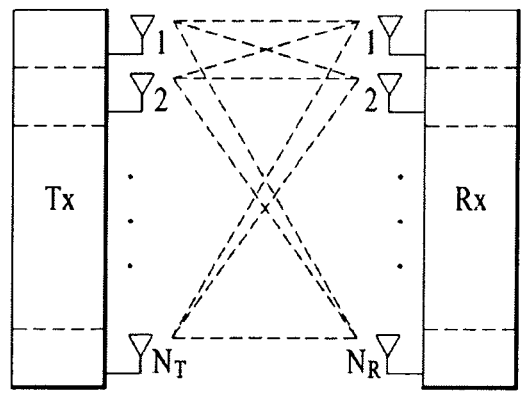
(a)
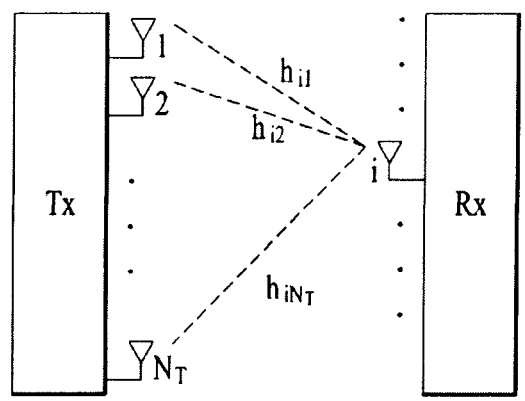
(b)

METHOD AND APPARATUS FOR HANDING OVER MOBILE CELL

This Application is a 35 U.S.C. §371 National Stage Entry of International Application No. PCT/KR2012/002182, filed Mar. 26, 2012 and claims the benefit of U.S. Provisional Application No. 61/468,545, filed Mar. 28, 2011, all of which are incorporated by reference in their entirety herein.

TECHNICAL FIELD

The present invention relates to a wireless communication system, and more particularly, to a method and apparatus for performing mobile cell-related handover.

BACKGROUND ART

A relay is an entity that relays signal transmission and reception between a macro evolved Node B (eNode B or eNB) and a User Equipment (UE). Relays may be introduced in order to extend service coverage and increase cell-edge throughput.

If the position of a relay changes over time, a cell covered by the relay may have mobility. Thus, the cell may be called a mobile cell.

DISCLOSURE

Technical Problem

If a UE performs handover from another cell to a mobile cell or from a mobile cell to another cell by a conventional handover procedure, the handover procedure may be unnecessary.

An object of the present invention devised to solve the conventional problem is to provide a method for performing mobile cell-related handover efficiently and accurately.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for performing a mobile relay handover at a user equipment includes reporting information about a state of the user equipment regarding the mobile relay handover to a serving base station, and performing the mobile relay handover based on a handover command received from the serving base station, the handover command being determined based on the state of the user equipment by the serving base station.

In another aspect of the present invention, a method for supporting a mobile relay handover includes receiving information about a state of a user equipment regarding the mobile relay handover, and determining whether the mobile relay handover is to be performed based on the state of the UE and transmitting a handover command to the user equipment.

In another aspect of the present invention, a user equipment for performing a mobile relay handover includes a transmission module for transmitting a signal to a network, a reception module for receiving a signal from the network, and a processor for controlling the user equipment including the transmission module and the reception module. The processor is configured to report information about a state of the user equipment regarding the mobile relay handover to a serving base station through the transmission module, and to perform the mobile relay handover based on a handover command received from the serving base station, the handover command being determined based on the state of the user equipment by the serving base station.

In another aspect of the present invention, a base station for supporting a mobile relay handover includes a transmission module for transmitting a signal to a user equipment, a reception module for receiving a signal from the user equipment, and a processor for controlling the base station including the transmission module and the reception module. The processor is configured to receive information about a state of the user equipment regarding the mobile relay handover through the reception module, to determine whether the mobile relay handover is to be performed based on the state of the user equipment, and to transmit a handover command to the user equipment through the transmission module.

The followings are applicable commonly to the embodiments of the present invention.

The state of the user equipment may be one of a first state in which the user equipment and a mobile relay travel in the same predicted route and a second state in which the user equipment and the mobile relay travel in different predicted routes.

If the mobile relay handover is a handover from the mobile relay to another base station, the mobile relay handover may not be performed when the state of the user equipment is the first state and the mobile relay handover may be performed when the state of the user equipment is the second state.

If the mobile relay handover is a handover from another base station to the mobile relay, the mobile relay handover may be performed when the state of the user equipment is the first state and the mobile relay handover may not be performed when the state of the user equipment is the second state.

The state of the user equipment may be determined based on at least one of information input by a user of the user equipment, identification information preset in the user equipment, and a sensing result of the user equipment.

The information input by the user of the user equipment may be a response to a request for confirming the state of the user equipment.

The preset identification information may include at least one of information about a predicted travel route of the mobile relay, identification information about the mobile relay, identification information about a transportation means in which the mobile relay is installed, time information, and place information.

The sensing result of the user equipment may be at least one of a result of sensing a signal from the mobile relay or a device co-located with the mobile relay and a result of sensing a medium containing information about at least one of a predicted travel route, a departure time, a departure location, an arrival time, and an arrival location of the mobile relay.

The state of the user equipment may be one of a first state in which the mobile relay handover is allowed and a second state in which the mobile relay handover is prohibited.

The mobile relay handover may be a handover from the mobile relay to another base station or a handover from another base station to the mobile relay.

The foregoing general description and upcoming detailed description of the present invention are exemplary, intended to give an additional description of the appended claims.

Advantageous Effects

According to the present invention, a method for performing mobile cell-related handover efficiently and accurately can be provided.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 5 illustrates the configuration of a Multiple Input Multiple Output (MIMO) wireless communication system;

BEST MODE FOR CARRYING OUT THE INVENTION

Figure 1:
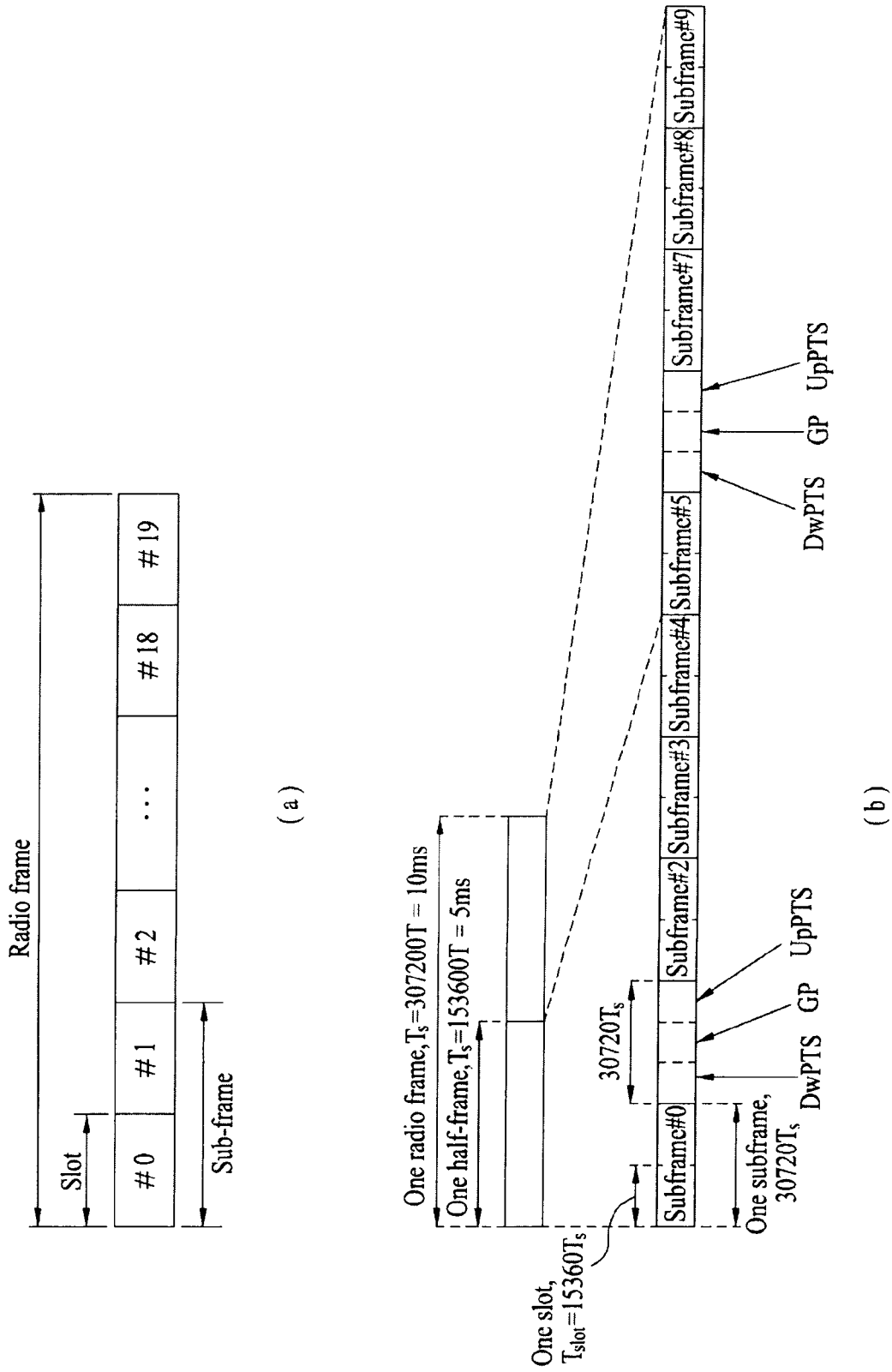
FIG. 1 illustrates the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the present disclosure, a Base Station (BS) is a terminal node of a network, which communicates directly with a User Equipment (UE). In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS.

The term 'BS' may be replaced with the term 'fixed station', 'Node B', 'evolved Node B (eNode B or eNB)', 'Access Point (AP)', etc. The term 'relay' may be used interchangeably with 'Relay Node (RN)', 'Relay Station (RS)', etc. The term 'terminal' may be replaced with the term 'TIE', 'Mobile Station (MS)', 'Mobile Subscriber Station (MSS)', 'Subscriber Station (SS)', etc.

Specific terms used in the following description are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus.

The embodiments of the present invention can be supported by standard documents disclosed for at least one of wireless access systems such as Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2 systems. Steps or parts that are not described to clarify the technical features of the present invention can be supported by those documents. Further, all terms as set forth herein can be explained by the standard documents.

The embodiments of the present invention can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications/General Packet Radio Service/Enhanced Data Rates for GSM Evolution (GSM/GPRS/EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunication System (UMTS). 3GPP LTE is a part of Evolved-UMTS (E-UMTS) using E-UTRA. 3GPP LTE employs OFDMA for downlink and SC-FDMA for uplink. LTE-A is an evolution of 3GPP LTE. WiMAX is described by the IEEE 802.16e standard (Wireless Metropolitan Area Network (WirelessMAN-OFDMA Reference System) and the IEEE 802.16m standard (WirelessMAN-OFDMA Advanced System). For clarity, this application focuses on the 3GPP LTE/LTE-A system. However, the technical features of the present invention are not limited thereto.

With reference to FIG. 1, the structure of a radio frame will be described below.

In a cellular Orthogonal Frequency Division Multiplexing (OFDM) wireless packet communication system, Uplink/Downlink (UL/DL) data packets are transmitted in subframes. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(a) is a diagram illustrating the structure of the type 1 radio frame. A downlink radio frame includes 10 subframes, each subframe including two slots in the time domain. A time required for transmitting one subframe is defined as a Transmission Time Interval (TTI). For example, one subframe may be 1 ms long and one slot may be 0.5 ms long. One slot includes a plurality of OFDM symbols in the time domain and a plurality of Resource Blocks (RBs) in the frequency domain. Since the 3GPP LTE system uses OFDMA on DL, an OFDM symbol is one symbol period. The OFDM symbol may be called an SC-FDMA symbol or symbol period. An RB is a resource allocation unit including a plurality of contiguous subcarriers in one slot.

The number of OFDM symbols included in one slot may be changed according to the configuration of a Cyclic Prefix (CP). There are two types of CPs, extended CP and normal CP. For example, if each OFDM symbol is configured to include a normal CP, one slot may include 7 OFDM symbols. If each OFDM symbol is configured to include an extended CP, the length of an OFDM symbol is increased and thus the number of OFDM symbols included in one slot is less than that in the case of a normal CP. In the case of the extended CP, for example, one slot may include 6 OFDM symbols. If a channel state is instable as is the case with a fast UE, the extended CP may be used in order to further reduce inter-symbol interference.

In the case of the normal CP, since one slot includes 7 OFDM symbols, one subframe includes 14 OFDM symbols. The first two or three OFDM symbols of each subframe may be allocated to a Physical Downlink Control Channel (PD-CCH) and the remaining OFDM symbols may be allocated to a Physical Downlink Shared Channel (PDSCH).

FIG. 1(b) illustrates the structure of the type 2 radio frame. The type 2 radio frame includes two half frames, each half frame including 5 subframes, a Downlink Pilot Time Slot (DwPTS), a Guard Period (GP), and an Uplink Pilot Time Slot (UpPTS). One subframe is divided into two slots. The DwPTS is used for initial cell search, synchronization, or channel estimation at a UE, and the UpPTS is used for channel estimation and UL transmission synchronization with a UE at an eNB. The GP is used to cancel UL interference between UL and DL, caused by the multi-path delay of a DL signal. One subframe includes two slots irrespective of the type of a radio frame.

The structures of radio frames are only exemplary. Accordingly, the number of subframes in a radio frame, the number of slots in a subframe, and the number of symbols in a slot may be changed in various manners.

Figure 2:
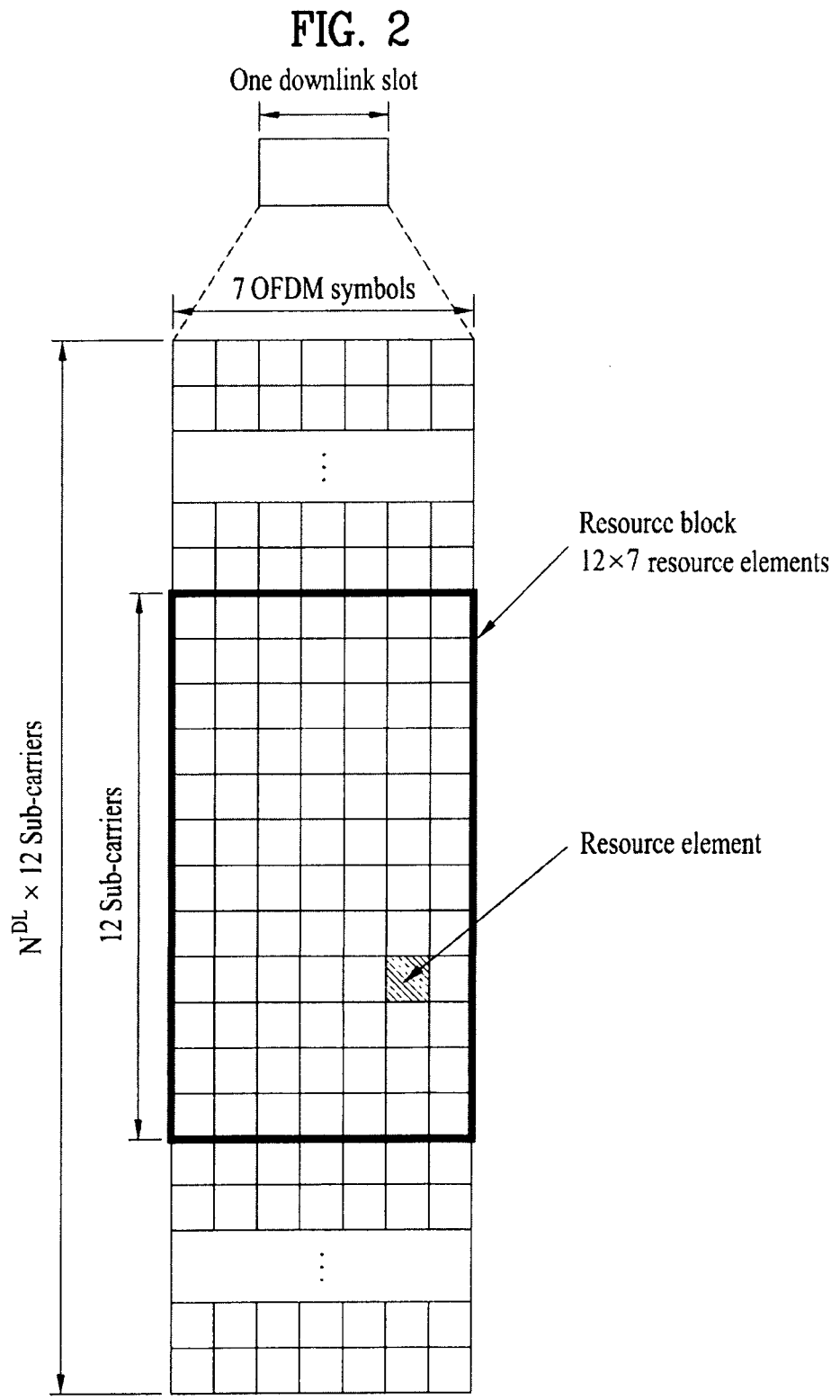
FIG. 2 illustrates the structure of a downlink resource grid for the duration of one downlink slot.

FIG. 2 illustrates the structure of a DL resource grid for the duration of one DL slot. A DL slot has 7 OFDM symbols in the time domain and an RB includes 12 subcarriers in the frequency domain, which does not limit the present invention. For example, a DL slot includes 7 OFDM symbols in a subframe with normal CPs, whereas a DL slot includes 6 OFDM symbols in a subframe with extended CPs. Each element of the resource grid is referred to as a Resource Element (RE). An RB includes 12×7 REs. The number of RBs in a DL slot, $N^{DL}$ depends on a DL transmission bandwidth. A UL slot may have the same structure as a DL slot.

Figure 3:
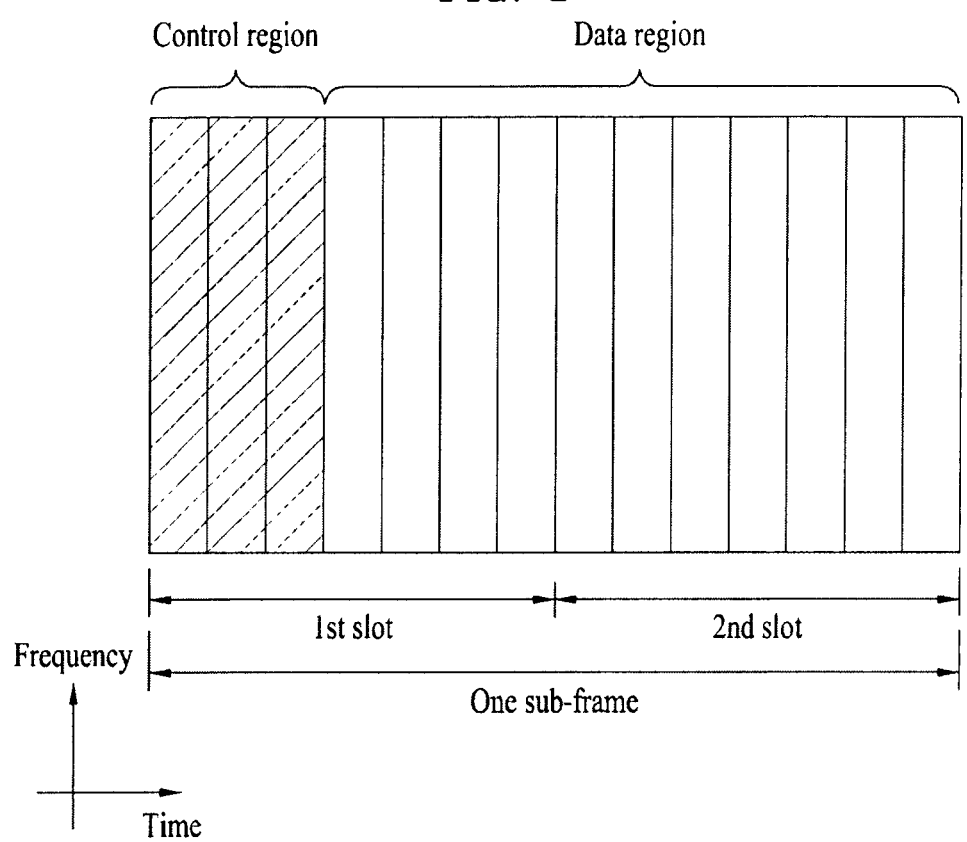
FIG. 3 illustrates the structure of a downlink subframe.

FIG. 3 illustrates the structure of a DL subframe. Up to three OFDM symbols at the start of the first slot of a DL subframe are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a Physical Downlink Control Channel (PDCCH), and a Physical Hybrid automatic repeat request (ARQ) Indicator Channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal as a response to a UL transmission. Control information carried on the PDCCH is called Downlink Control Information (DCI). The DCI transports UL scheduling information, DL scheduling information, or UL transmission power control commands for UE groups. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE includes a plurality of RE Groups (REGs). The format of a PDCCH and the number of available bits for the PDCCH are determined according to the relationship between the number of CCEs and a coding rate provided by the CCEs. An eNB determines a PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is destined for a specific UE, the CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a random access response to a random access preamble transmitted by a UE, its CRC may be masked by a Random Access-RNTI (RA-RNTI).

Figure 4:
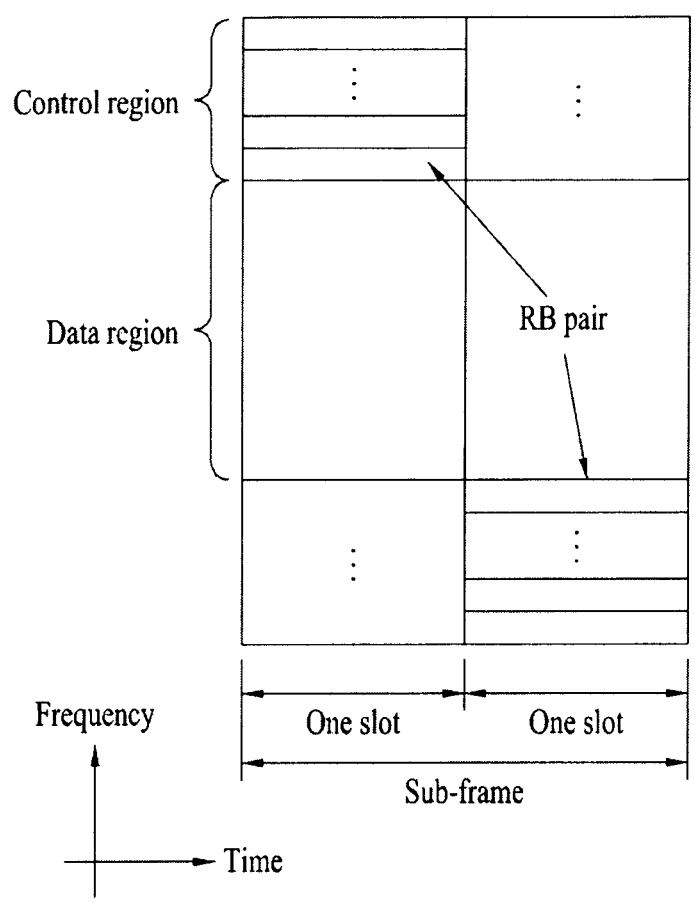
FIG. 4 illustrates the structure of an uplink subframe.

FIG. 4 illustrates the structure of a UL subframe. A UL subframe may be divided into a control region and a data region in the frequency domain. A Physical Uplink Control Channel (PUCCH) carrying uplink control information is allocated to the control region and a Physical Uplink Shared Channel (PUSCH) carrying user data is allocated to the data region. To maintain a single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of Multiple Input Multiple Output (MIMO) System

FIG. 5 illustrates the configuration of a MIMO wireless communication system.

Referring to FIG. 5(a), when the number of Transmission (Tx) antennas and the number of Reception (Rx) antennas are increased to $N_T$ and $N_R$, respectively at both a transmitter and a receiver, a theoretical channel transmission capacity increases in proportion to the number of antennas, compared to the use of a plurality of antennas at only one of the transmitter and the receiver. Therefore, transmission rate and frequency efficiency are remarkably increased. Along with the increase of channel transmission capacity, the transmission rate may be increased in theory to the product of a maximum transmission rate $R_o$ that may be achieved with a single antenna and a rate increase rate $R_i$.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna wireless communication system. Since the theoretical capacity increase of the MIMO wireless communication system was verified in the middle 1990s, many techniques have been actively developed to increase data rate in real implementation. Some of the techniques have already been reflected in various wireless communication standards including standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas will be described in detail through mathematical modeling.

Regarding a transmission signal, up to $N_T$ pieces of information can be transmitted through the $N_T$ Tx antennas, as expressed as the following vector.

$$s=[s_1,s_2,\ldots,s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector may be given as $$\hat{s}=[\hat{s}_1,\hat{s}_2,\ldots,\hat{s}_{N_T}]^T=[P_1s_1,P_2s_2,\ldots,P_{N_T}s_{N_T}]^T \quad \text{[Equation 3]}$$

The transmission power-controlled transmission information vector $\hat{s}$ may be expressed as follows, using a diagonal matrix P of transmission power.

$$\hat{s}=\begin{bmatrix} P_1 & & & 0 \\ & P_2 & & \\ & & \ddots & \\ 0 & & & P_{N_T} \end{bmatrix}\begin{bmatrix} s_1 \\ s_2 \\ \vdots \\ s_{N_T} \end{bmatrix}=Ps \quad \text{[Equation 4]}$$

$N_T$ transmission signals $x_1, x_2, \ldots, x_{N_T}$ may be generated by multiplying the transmission power-controlled information vectors $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by $$x=\begin{bmatrix} x_1 \\ x_2 \\ \vdots \\ x_i \\ \vdots \\ x_{N_T} \end{bmatrix} \quad \text{[Equation 5]}$$

$$=\begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix}\begin{bmatrix} \hat{s}_1 \\ \hat{s}_2 \\ \vdots \\ \hat{s}_j \\ \vdots \\ \hat{s}_{N_T} \end{bmatrix}$$

$$=W\hat{s}$$

$$=WPs$$

Here, $w_{ij}$ denotes a weight between a $j^{th}$ piece of information and an $i^{th}$ Tx antenna.

Given $N_R$ Rx antennas, signals received at the Rx antennas, $y_1, y_2, \ldots, y_{N_R}$ may be represented as the following vector.

$$y=[y_1,y_2,\ldots,y_{N_R}]^T \quad \text{[Equation 6]}$$

When channels are modeled in the MIMO wireless communication system, they may be distinguished according to the indexes of Tx and Rx antennas. A channel between a $j^{th}$ Tx antenna and an $i^{th}$ Rx antenna is denoted by $h_{ij}$. One thing to note herein is that the index of an Rx antenna precedes the index of a Tx antenna in $h_{ij}$.

FIG. 5(b) illustrates channels from $N_T$ Tx antennas to an $i^{th}$ Rx antenna. The channels may be collectively represented as a vector or a matrix. Referring to FIG. 5(b), the channels from the $N_T$ Tx antennas to the $i^{th}$ Rx antenna may be expressed as [Equation 7].

$$h_i^T=[h_{i1},h_{i2},\ldots,h_{iN_T}] \quad \text{[Equation 7]}$$

Hence, all channels from the $N_T$ Tx antennas to the $N_R$ Rx antennas may be expressed as the following matrix.

$$H=\begin{bmatrix} h_1^T \\ h_2^T \\ \vdots \\ h_i^T \\ \vdots \\ h_{N_R}^T \end{bmatrix}=\begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix} \quad \text{[Equation 8]}$$

Actual channels experience the above channel matrix H and then are added with Additive White Gaussian Noise (AWGN). The AWGN $n_1, n_2, \ldots, n_{N_R}$ added to the $N_R$ Rx antennas is given as the following vector.

$$n=[n_1,n_2,\ldots,n_{N_R}]^T \quad \text{[Equation 9]}$$

From the above mathematical modeling, the received signal vector is given as $$y=\begin{bmatrix} y_1 \\ y_2 \\ \vdots \\ y_i \\ \vdots \\ y_{N_R} \end{bmatrix} \quad \text{[Equation 10]}$$

$$=\begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R1} & h_{N_R2} & \cdots & h_{N_RN_T} \end{bmatrix}\begin{bmatrix} x_1 \\ x_2 \\ \vdots \\ x_j \\ \vdots \\ x_{N_T} \end{bmatrix}+\begin{bmatrix} n_1 \\ n_2 \\ \vdots \\ n_i \\ \vdots \\ n_{N_R} \end{bmatrix}$$

$$=Hx+n$$

The numbers of rows and columns in the channel matrix H representing channel states are determined according to the numbers of Rx and Tx antennas. Specifically, the number of rows in the channel matrix H is equal to the number of Rx antennas, $N_R$ and the number of columns in the channel matrix H is equal to the number of Tx antennas, $N_T$. Hence, the channel matrix H is an $N_R \times N_T$ matrix.

The rank of a matrix is defined as the smaller between the number of independent rows and the number of independent columns in the matrix. Accordingly, the rank of the matrix is not larger than the number of rows or columns of the matrix. The rank of the channel matrix H, rank(H) satisfies the following constraint.

$$\text{rank}(H) \leq \min(N_T, N_R) \qquad \text{[Equation 11]}$$

The rank of a matrix may also be defined as the number of non-zero eigenvalues, when the matrix is decomposed by EigenValue Decomposition (EVD). Similarly, the rank of a matrix may be defined as the number of non-zero singular values, when the matrix is decomposed by Singular Value Decomposition (SVD). Therefore, the rank of a channel matrix may be the maximum number of different pieces of information that can be transmitted on a physical channel, in its physical meaning.

In MIMO transmission, the term 'rank' is the number of paths in which signals are independently transmitted, and the term 'number of layers' is the number of signal streams transmitted through respective paths. In general, since a transmitter transmits as many layers as the rank of signal transmission, the rank has the same meaning as the number of layers, unless otherwise noted.

Coordinated Multi-Point (CoMP)

To satisfy enhanced system performance requirements for the 3GPP LTE-A system, CoMP transmission and reception technology (co-MIMO, collaborative MIMO or network MIMO) has been proposed. The CoMP technology can increase the performance of UEs located at a cell edge and an average sector throughput.

It is known that Inter-Cell Interference (ICI) generally degrades the performance of a UE at a cell edge and an average sector throughput in a multi-cellular environment with a frequency reuse factor of 1. To reduce ICI, a simple ICI mitigation technique such as UE-specific power control-based Fractional Frequency Reuse (FFR) is used in the legacy LTE system. However, it may be preferred to reduce the ICI or reuse the ICI as a desired signal for the UE, rather than to decrease the utilization of frequency resources per cell. For this purpose, CoMP transmission techniques may be adopted.

DL CoMP schemes are classified largely into Joint Processing (JP) and Coordinated Scheduling/Beamforming (CS/CB).

In the JP scheme, each point (eNB) of CoMP cooperation units may use data. The CoMP cooperation units refer to a set of eNBs participating in a CoMP transmission operation. The JP scheme is further branched into joint transmission and dynamic cell selection.

Joint transmission is a technique of transmitting PDSCHs from a plurality of points (a part or all of CoMP cooperation units) at one time. That is, a plurality of transmission points may simultaneously transmit data to a single UE. The joint transmission scheme can improve the quality of a received signal coherently or non-coherently and actively eliminate interference with other UEs, as well.

Dynamic cell selection is a technique of transmitting a PDSCH from one point (of CoMP cooperation units) at one time. That is, one point of the CoMP cooperation units transmits data to a single UE at a given time point, while the other points of the CoMP cooperation units do not transmit data to the UE at the time point. A point to transmit data to a UE may be dynamically selected.

In the CS/CB scheme, CoMP cooperation units may perform cooperative beamforming for data transmission to a single UE. While only a serving cell transmits data to the UE, user scheduling/beamforming may be determined through coordination among cells of the CoMP cooperation units.

UL CoMP reception refers to UL reception of a transmitted signal through coordination at a plurality of geographically separated points. UL CoMP schemes include Joint Reception (JR) and Coordinated Scheduling/Beamforming (CS/CB).

In JR, a plurality of reception points receive a signal transmitted on a PUSCH. CS/CB is a technique in which while only one point receives a PUSCH, user scheduling/beamforming is determined through coordination among the cells of CoMP cooperation units.

In the CoMP system, multi-cellular eNBs may jointly support data transmission for a UE. Further, since the eNBs simultaneously support one or more UEs in the same radio frequency resources, system performance can be increased. The eNBs may perform Space Division Multiple Access (SDMA) based on channel state information between the eNBs and the UE.

A serving eNB and one or more cooperative eNBs are connected to a scheduler through a backbone network in the CoMP system. The scheduler may receive feedback channel information about channel states between each UE and cooperative eNBs as measured by the eNBs through the backbone network and operate based on the channel information. For example, the scheduler may schedule cooperative MIMO information for the serving eNB and one or more cooperative eNBs. That is, the scheduler may directly transmit a command related to a cooperative MIMO operation to each eNB.

As described above, the CoMP system may be regarded as a virtual MIMO system designed by grouping a plurality of cells. Basically, a MIMO communication scheme using multiple antennas may apply to the CoMP system.

DL Channel State Information (CSI) Feedback

MIMO schemes may be classified into open-loop MIMO and closed-loop MIMO. In open-loop MIMO, a MIMO transmitter performs MIMO transmission without receiving a CSI feedback from a MIMO receiver. On the other hand, the MIMO transmitter receives a CSI feedback from the MIMO receiver and performs MIMO transmission based on the CSI feedback in closed-loop MIMO. To achieve a multiplexing gain through MIMO Tx antennas, the transmitter and the receiver each may perform beamforming based on CSI in the closed-loop MIMO scheme. To enable the receiver (e.g. a UE) to feed back CSI, the transmitter (e.g. an eNB) may allocate a UL control channel or a UL shared channel to the receiver.

A CSI feedback may include a Rank Indication (RI), a Precoding Matrix Index (PMI), and a Channel Quality Indicator (CQI).

An RI is information about a channel rank. The channel rank is the maximum number of layers (or streams) that may carry different information in the same time-frequency resources. Because the rank is determined mainly according to the long-term fading of a channel, the RI may be fed back in a longer period (i.e. less frequently) than a PMI and a CQI.

A PMI is information about a precoding matrix used for transmission of a transmitter, reflecting the spatial characteristics of channels. Precoding refers to mapping transmission layers to Tx antennas. A layer-antenna mapping relationship may be determined according to a precoding matrix. The PMI is the index of an eNB precoding matrix preferred by the UE, selected based on a metric such as Signal-to-Interference plus Noise Ratio (SINR), etc. In order to reduce the feedback overhead of precoding information, the transmitter and the receiver may share a codebook with a plurality of precoding matrices and the receiver may feed back only the index of a specific precoding matrix in the codebook.

A CQI is information representing a channel quality or a channel strength. The CQI may be expressed as a predetermined Modulation Coding Scheme (MCS). That is, a feedback CQI index indicates a corresponding modulation scheme and coding rate. In general, the CQI reflects a reception SINR that can be achieved when an eNB configures spatial channels using a PMI.

A system supporting an extended antenna configuration (e.g. an LTE-A system) considers achievement of an additional multi-user diversity by the use of MU-MIMO. Due to the existence of interference channels between UEs multiplexed in an antenna domain in MU-MIMO, it is necessary to avoid interference with other UEs, when an eNB transmits a DL signal to one of multiple UEs based on a CSI feedback received from the one UE. Accordingly, more accurate CSI than in Single User MIMO (SU-MIMO) should be fed back for a reliable MU-MIMO operation.

For more accurate measurement and reporting of CSI, a new CSI feedback scheme may be adopted by modifying conventional CSI including an RI, a PMI, and a CQI. For example, precoding information fed back from the receiver may be indicated by a set of two PMIs. One of the two PMIs (PMI 1) has a long-term and/or wideband property, referred to as W1, whereas the other PMI (PMI 2) has a short-term and/or subband property, referred to as W2. A final PMI may be determined by combining W1 and W2 (or a function of W1 and W2). For example, let the final PMI be denoted by W. Then W=W1*W2 or W=W2*W1.

W1 reflects the average frequency and/or time characteristics of channels. In other words, W1 may be defined as CSI that reflects long-term channel characteristics in time, wideband channel characteristics in frequency, or both long-term channel characteristics in time and wideband channel characteristics in frequency. To represent these characteristics of W1, W1 will be referred to as long term-wideband CSI (or a long term-wideband PMI).

Compared to W1, W2 reflects relatively instantaneous channel characteristics. In other words, W2 may be defined as CSI that reflects short-term channel characteristics in time, subband channel characteristics in frequency, or both short-term channel characteristics in time and subband channel characteristics in frequency. To represent these characteristics of W2, W2 will be referred to as short term-subband CSI (or a short term-subband PMI).

To determine a final precoding matrix W with two pieces of information having different characteristics representing channel states (e.g. W1 and W2), separate codebooks with precoding matrices representing channel information having different characteristics (e.g. a first codebook for W1 and a second codebook for W2) need to be configured. These codebooks may be referred to as hierarchical codebooks. Determination of a final codebook using hierarchical codebooks is called hierarchical codebook transformation.

For example, the long-term covariance matrix of channels expressed as [Equation 12] may be used for hierarchical codebook transformation.

$$W=\text{norm}(W1\,W2) \quad \text{[Equation 12]}$$

In [Equation 12], W1 (i.e. the long term-wideband PMI) is an element (i.e. a codeword) of a codebook (e.g. the first codebook) designed to reflect long term-wideband channel information. That is, W1 is a precoding matrix included in the first codebook reflecting long term-wideband channel information. On the other hand, W2 (i.e. the short term-subband PMI) is a codeword of a codebook (e.g. the second codebook) designed to reflect long term-wideband channel information. That is, W2 is a precoding matrix included in the second codebook reflecting short term-subband channel information. W is a codeword of a final codebook. norm(A) is a matrix obtained by normalizing the norm of each column of matrix A to 1.

W1 and W2 may have the structures expressed as [Equation 13], by way of example.

$$W1(i) = \begin{bmatrix} X_i & 0 \\ 0 & X_i \end{bmatrix} \quad \text{[Equation 13]}$$

$$W2(j) = \overbrace{\begin{bmatrix} e_M^k & e_M^l & \cdots & e_M^m \\ \alpha_j e_M^k & \beta_j e_M^l & & \gamma_j e_M^m \end{bmatrix}}^{r\ columns} \text{ (if rank = r)}$$

In [Equation 13], W1 may be defined as a block diagonal matrix in which each block is an identical matrix $X_i$. One block $X_i$ may be defined as an $(N_t/2) \times M$ matrix where $N_t$ is the number of Tx antennas. $e_M^p$ of W2 (p=k, l, ..., m) is an M×1 vector where a $p^{th}$ element of the M vector elements is 1 and the other elements are 0. If $e_M^p$ is multiplied by W1, a $p^{th}$ column is selected from among the columns of W1. Thus this vector may be referred to as a selection vector. As the value of M increases, the number of feedback vectors transmitted at one time is increased to represent long term/wideband channels. Consequently, feedback accuracy is also increased. However, a larger M value leads to a decrease in the codebook size of W1 that is less frequently fed back, and an increase in the codebook size of W2 that is more frequently fed back. As a result, feedback overhead is increased. That is, feedback overhead and feedback accuracy are in a tradeoff relationship. Accordingly, the value of M may be determined such that feedback overhead is not too much, while feedback accuracy is maintained at an appropriate level. In W2, $\alpha_j$, $\beta_j$, and $\gamma_j$ represent predetermined phase values. In [Equation 13], 1≤k, l, m≤M where k, l, and m are integers.

The codebook structures of [Equation 13] are designed so as to reflect correlation characteristics between channels, if cross-polarized (X-pol) antennas are arranged densely (in general, the distance between adjacent antennas is equal to or less than a half of a signal wavelength). Exemplary cross-polarized antenna configurations are listed in [Table 1] below.

TABLE 1

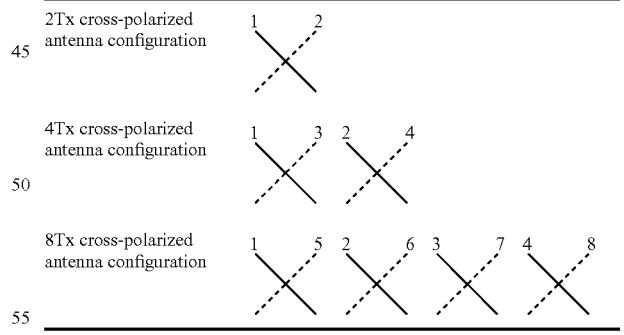

Referring to [Table 1], the 8Tx cross-polarized antenna configuration groups eight antennas into two groups having different polarizations. The antennas of antenna group 1 (antennas 1, 2, 3 and 4) have the same polarization (e.g. vertical polarization) and the antennas of antenna group 2 (antennas 5, 6, 7 and 8) have the same polarization (e.g. horizontal polarization). The two antenna groups are co-located. For example, antennas 1 and 5 may be co-located, antennas 2 and 6 may be co-located, antennas 3 and 7 may be co-located, and antennas 4 and 8 may be co-located. In other words, the antennas of each antenna group have the same polarization, like a Uniform Linear Array (LUA) and the correlations between antennas in each antenna group have a linear phase increment property. The correlation between the antenna groups is characterized by phase rotation.

Considering that a codebook is eventually quantized values of channels, it is necessary to design a codebook based on real channel characteristics. To verify that real channel characteristics are reflected in the codewords of the codebooks designed as illustrated in [Equation 13], a rank-1 codebook will be described as an example. [Equation 14] describes a final codeword W determined to be the product of a codeword W1 and a codeword W2, for rank 1.

$$W1(i) * W2(j) = \begin{bmatrix} X_i(k) \\ \alpha_j X_i(k) \end{bmatrix}$$ [Equation 14]

In [Equation 14], the final codeword is expressed as an $N_t \times 1$ vector divided into an upper vector $x_i(k)$ and a lower vector $\alpha_j x_i(k)$. The upper vector $x_i(k)$ represents the correlation characteristics of the horizontal polarization antenna group of cross-polarized antennas and the lower vector $\alpha_j x_i(k)$ represents the correlation characteristics of the vertical polarization antenna group of cross-polarized antennas. $x_i(k)$ may be expressed as a vector (e.g. a Discrete Fourier Transform (DFT) matrix) having the linear phase increment property, reflecting the correlation characteristics between antennas in each antenna group.

With the use of the above-described codebooks, a more accurate channel feedback is possible than with the use of a single codebook. Therefore, highly accurate channel feedback enables a single-cell MU-MIMO operation. For a similar reason, highly accurate channel feedback is required for a CoMP operation. For example, in CoMP JT, a plurality of eNBs transmit the same data to a specific UE through cooperation. In theory, the CoMP JT system may be regarded as a MIMO system with a plurality of geographically distributed antennas. That is, an MU-MIMO operation in CoMP JT also requires high accuracy of channel information to avoid interference between co-scheduled UEs, like a single-cell MU-MIMO operation. CoMP CB also requires high accuracy of channel information to avoid interference that a neighbor cell causes to a serving cell.

Relay Node (RN)

Use of RNs may be considered, for example, for the purpose of extending the coverage of high data rates, enhancing group mobility, deploying a temporary network, improving cell-edge throughput, and/or providing network coverage to a new area.

An RN forwards data between an eNB and a UE. Two types of links having different characteristics in respective carrier frequency bands (a backhaul link and an access link) are established for the RN. The eNB may cover a donor cell. The RN is connected wirelessly to a wireless access network through the donor cell.

If the backhaul link between the eNB and the RN uses a DL frequency band or DL subframe resources, it is called a backhaul DL. If the backhaul link uses a UL frequency band or UL subframe resources, it is called a backhaul UL. The frequency bands are FDD resources and the subframes are TDD resources. Likewise, if the access link between the RN and the UE(s) uses a DL frequency band or DL subframe resources, it is called an access DL. If the access link uses a UL frequency band or UL subframe resources, it is called an access UL.

The functions of UL reception and DL reception are required for an eNB and the functions of UL transmission and DL reception are required for a UE. For an RN, the functions of backhaul UL transmission to an eNB, access UL reception from a UE, backhaul DL reception from the eNB, and access DL transmission to the UE are required.

With respect to the RN's usage of a frequency band (or spectrum), its operation can be classified as 'in-band' and 'out-band'. For an in-band RN, a backhaul link shares the same frequency band with an access link. If the backhaul link and the access link operate in different frequency bands, the RN is an out-band RN. In both in-band and out-band relaying, a UE (hereinafter, referred to as a legacy UE) operating in the conventional LTE system such as one conforming to Release-8 should be able to access a donor cell.

Depending on whether a UE is aware of the existence of an RN, RNs may be classified into a transparent RN and a non-transparent RN. If the UE does not perceive whether it communicates with a network via an RN, the RN is a transparent RN. In contrast, if the UE perceives whether it communicates with a network via an RN, the RN is a non-transparent RN.

In relation to control of RNs, RNs may be classified into an RN configured as a part of a donor cell and an RN that self-controls a cell.

The former RN may have an RN ID, although it does not have its own cell ID. If at least a part of Radio Resource Management (RRM) is controlled by an eNB covering the donor cell, the RN is regarded as configured as a part of the donor cell (even though the other parts of the RRM reside in the RN). Preferably, this RN can support legacy UEs. For instance, smart repeaters, decode-and-forward relays, Layer 2 (L2) relays, and Type-2 relays form a part of a donor cell.

The latter RN controls one or more cells. The cells are allocated their unique physical cell IDs and they may use the same RRM mechanism. From the viewpoint of a UE, there is no distinction between accessing a cell controlled by an RN and accessing a cell controlled by a macro eNB. Preferably, a cell controlled by this type of RN may support legacy UEs. For example, RNs of this type include self-backhauling RNs, Layer 3 (L3) relays, Type-1 relays, and Type-1a relays.

A Type-1 relay is an in-band RN that controls a plurality of cells. Each of the plurality of cells appears to a UE as a separate cell distinct from a donor cell. The plurality of cells have their own physical cell IDs (as defined in LTE Release-8) and the RN can transmit its own synchronization channel, Reference Signals (RSs), etc. During a single-cell operation, a UE may receive scheduling information and an HARQ feedback directly from the RN and transmit its control channels (a Scheduling Request (SR), a CQI, an ACK/NACK, etc.) to the RN. The Type-1 relay appears as a legacy eNB (operating in conformance to LTE Release-8) to a legacy UE (conforming to LTE Release-8). That is, the Type-1 relay has backward compatibility. On the other hand, to LTE-A UEs, the Type-1 relay appears different from a legacy eNB. Thus the Type-1 relay can enhance performance.

Except for its out-band operation, a Type-1a relay has the same features as the Type-1 relay. The Type-1a relay may be configured such that the influence of its operation on an L1 operation is minimized or eliminated.

A Type-2 relay is an in-band RN that does not have its own physical cell ID and thus does not form a new cell. Since the Type-2 relay is transparent to legacy UEs, the legacy UEs do not notice the existence of the Type-2 relay. The Type-2 relay can transmit a PDSCH but does not transmit at least a Common Reference Signal (CRS) and a PDCCH.

In order to allow in-band relaying, some resources in the time-frequency domain should be set aside for a backhaul link and these resources may be configured not to be used for an access link. This is called resource partitioning.

A description will be given of the general principle of resource partitioning at an RN. A backhaul DL and an access DL may be TDM-multiplexed in one carrier frequency (that is, only one of the backhaul DL and the access DL is active at a specific time). Similarly, a backhaul UL and an access UL may be TDM-multiplexed in one carrier frequency (that is, only one of the backhaul UL and the access UL is active at a specific time).

Multiplexing of backhaul links in FDD is performed such that backhaul DL transmission and backhaul UL transmission take place in a DL frequency band and a UL frequency band, respectively. In comparison, multiplexing of backhaul links in TDD is performed such that backhaul DL transmission and backhaul UL transmission take place in a DL subframe band between an eNB and an RN and a UL subframe between the eNB and the RN, respectively.

In the case of an in-band RN, for example, if backhaul DL reception from an eNB and access DL transmission to a UE are performed simultaneously in the same frequency band, a signal transmitted from the transmitter of the RN may be received at the receiver of the RN. As a result, signal interference or Radio Frequency (RF) jamming may occur at the RF front-end of the RN. Likewise, if access UL reception from a UE and backhaul UL transmission to an eNB take place simultaneously in the same frequency band, the RF front-end of the RN may experience signal interference. Therefore, simultaneous transmission and reception in the same frequency band may not be feasible unless a reception signal and a transmission signal are sufficiently isolated from each other, for example, a Tx antenna is geographically apart enough from an Rx antenna (e.g. on the ground/underground).

Figure 6:
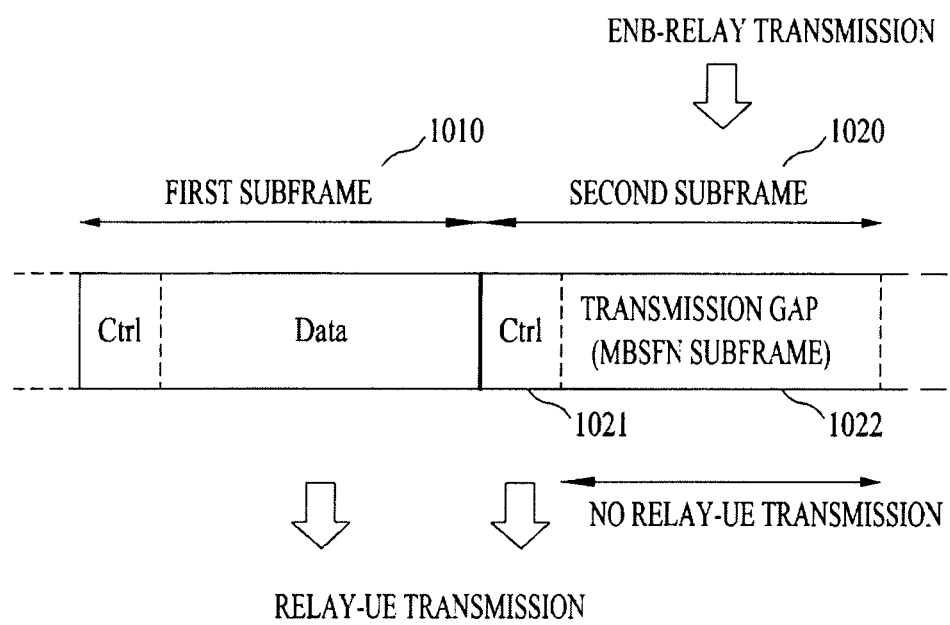
FIG. 6 illustrates resource partitioning for transmission to a Relay Node (RN)

One way to handle the signal interference is to operate the RN such that while the RN is receiving a signal from a donor cell, it is not transmitting signals to UEs. That is, a gap is created in RN-to-UE transmission and UEs (including legacy UEs) are not supposed to expect any RN transmission during the gap. In FIG. 6, a first subframe 1010 is a general subframe carrying a DL (i.e. an access DL) control signal and data from an RN to a UE, and a second subframe 1020 is a Multicast Broadcast Single Frequency Network (MBSFN) subframe that carries a control signal from the RN to the UE in a control region 1021 but does not carry a signal from the RN to the UE in the remaining region 1022 of the MBSFN subframe. Since a legacy UE expects reception of a PDCCH in every DL subframe (that is, the RN needs to support legacy UEs' reception of a PDCCH and measurement using the PDCCH within its coverage), a PDCCH needs to be transmitted in every DL subframe, for reliable operation of the legacy UEs. Accordingly, the RN needs to perform access DL transmission, instead of backhaul DL reception, even in the first N (N=1, 2 or 3) OFDM symbols of a subframe set for DL transmission (i.e. backhaul DL transmission) from the eNB to the RN, that is, in the second subframe 1020. In this context, a PDCCH is transmitted from the RN to a UE in the control region 1021 of the second subframe 1020, thereby providing backward compatibility to legacy UEs served by the RN. While no RN-to-UE transmission takes place in the remaining region 1022 of the second subframe 1020, the RN can receive a signal from the eNB in the remaining region 1022. This frequency partitioning prevents simultaneous access DL transmission and backhaul DL reception at an in-band RN.

The second subframe 1020 being an MBSFN subframe will be detailed below. The MBSFN subframe is basically a subframe for MBMS. MBMS refers to a service of transmitting the same signal simultaneously from a plurality of cells. The control region 1021 of the second subframe 1020 may be referred to as a relay non-hearing period. During the relay non-hearing period, the RN transmits an access DL signal without receiving a backhaul DL signal. As stated before, the relay non-hearing period may be set to be 1, 2 or 3 OFDM symbols long. The RN may perform access DL transmission to a UE during the relay non-hearing period 1021 and perform backhaul DL reception from the eNB in the remaining region 1022. Because the RN is not allowed to perform simultaneous transmission and reception in the same frequency band, the RN takes a certain time to transition from a Tx mode to an Rx mode. Therefore, it is necessary to set a Guard Time (GT) in which the RN can switch from the Tx mode to the Rx mode in a starting period of the backhaul DL reception region 1022. When the RN performs backhaul DL reception from the eNB and access DL transmission to a UE, a GT may also be set for switching from the Rx mode to the Tx mode of the RN. The length of the GT may be given as a time-domain value, for example, k (k≥1) time samples ($T_s$) or one or more OFDM symbols. If successive backhaul DL subframes are configured for the RN according to a specific subframe timing alignment relationship, a GT may not be defined or set in the last part of a subframe. To maintain backward compatibility, the GT may be defined only in a frequency area set for backhaul DL subframe transmission (if a GT is set in an access DL period, legacy UEs may not be supported). The RN may receive a PDCCH and a PDSCH from the eNB in the backhaul DL reception period 1022 except for the GT. The PDCCH transmitted to the RN by the eNB in the data region (the transmission gap in FIG. 6) of the backhaul DL subframe may be referred to as a Relay-PDCCH (R-PDCCH), distinguishably from a conventional PDCCH.

Handover

In a wireless communication system, handover is a function of enabling a UE to automatically tune to a new communication channel of a neighbor eNB, for seamless communication, when the UE moves out of the service area of a serving eNB and enters the service area of the neighbor eNB in a call-connected state.

Figure 7:
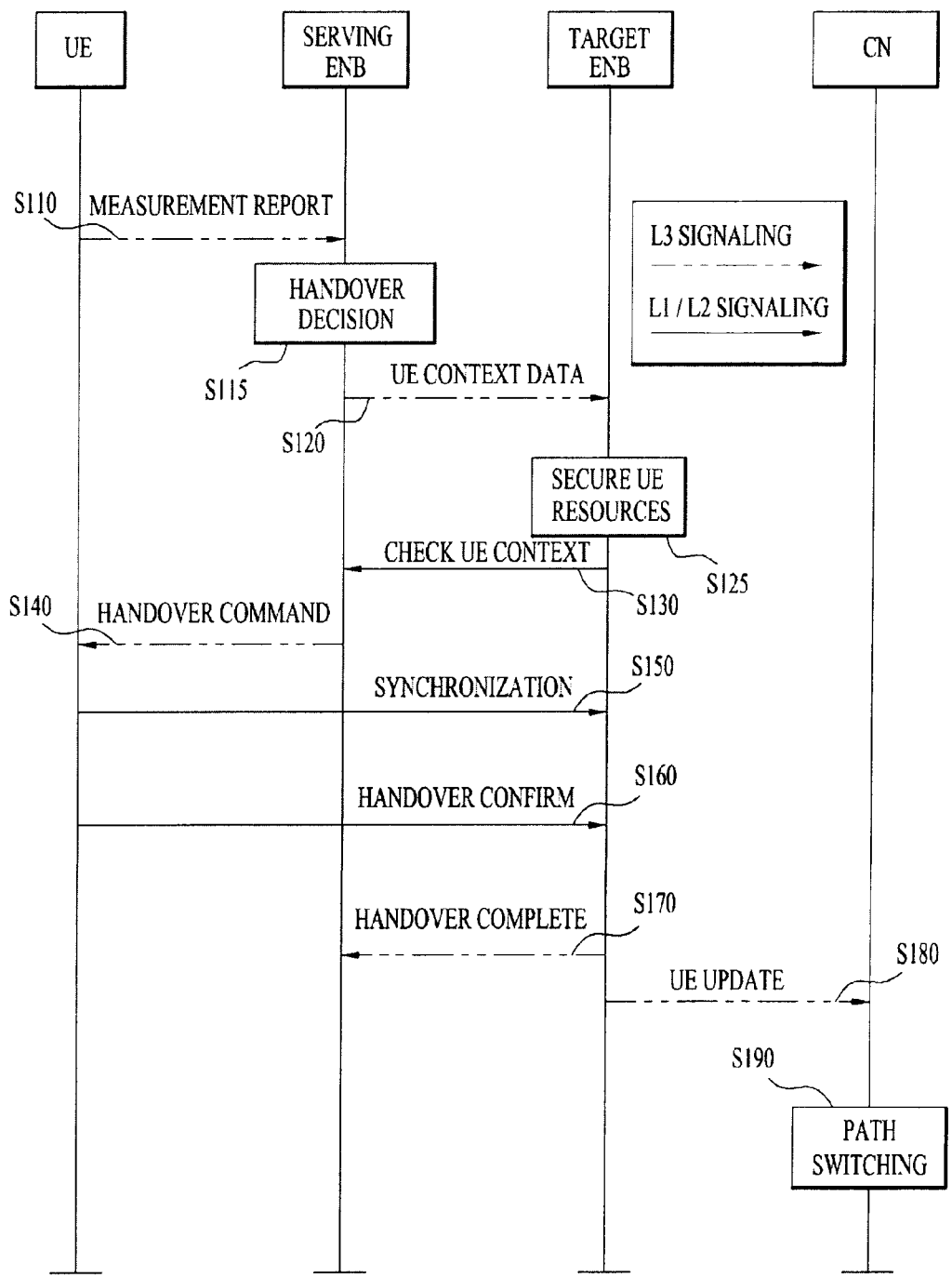
FIG. 7 illustrates a signal flow for a handover procedure.

FIG. 7 illustrates a handover procedure.

If a condition set by a serving eNB is satisfied or upon generation of a predetermined event, a UE transmits a measurement report message to the serving eNB (S110). The serving eNB is a network node connected to the UE before handover. If the serving eNB determines from the measurement report message received from the UE that handover is needed, the serving eNB decides on handover (S115).

The serving eNB transmits a handover prepare message including UE context information to a target eNB (S120). The target eNB is an eNB that manages a new cell into which the UE moves by handover. The UE context information includes information about the Quality of Service (QoS) of a service that the serving eNB provides to the UE, a radio bearer type, etc.

The target eNB determines whether to accept the handover request, taking into account its available wired/wireless resources (S125). The target eNB transmits resource allocation information along with a new temporary ID (C-RNTI) for the UE to the serving eNB (S130).

The serving eNB transmits a handover command to the UE (S140) and starts to transmit user data to the target eNB. The UE performs L1 signaling and L2 signaling in order to reconfigure a radio environment including timing synchronization with the target eNB (S150). The UE receives timing information from the target eNB and then transmits a handover confirm message to the target eNB (S160).

The target eNB transmits a handover complete message indicating successful handover to the serving eNB (S170). Then the serving eNB releases all resources from the UE. The target eNB requests location update for the UE to a Core Network (CN) (S180). The CN transmits user data previously directed to the serving eNB to the target eNB by switching a path configuration for the UE (S190). Upon completion of the handover procedure, the target eNB becomes a new serving eNB for the UE.

Mobile Relay

A mobile relay is an RN that relays signal transmission and reception between a macro eNB and a UE, like a general RN, but is not fixed in position.

For example, an RN installed in a transportation means (a car, a bus, a train, etc.) may be a mobile relay. A cell (i.e. a mobile cell) covered by the RN installed in the transportation means may cover the inside and vicinity of the transportation means. Preferably, the mobile relay may serve mainly UEs inside the transportation means.

Problems encountered with a service provided by a macro eNB (or a fixed eNB) can be solved for a UE inside a transportation means by deploying a mobile relay in the transportation means. For example, the attenuation of a signal strength caused by the transportation means, its windows, etc. may be overcome. In addition, if a plurality of UEs move together, they may simultaneously perform handover from a serving eNB to a target eNB. With the use of a mobile relay, the multi-handover situation may be readily handled based on group mobility.

Because the position of a mobile relay changes over time, problems that a legacy system does not face may be produced. For example, if a conventional handover procedure with no regard to a mobile relay is still used, this may be unnecessary to both a UE and a network. Accordingly, a method for solving this problem should be provided, when a mobile relay is introduced.

Figure 8:
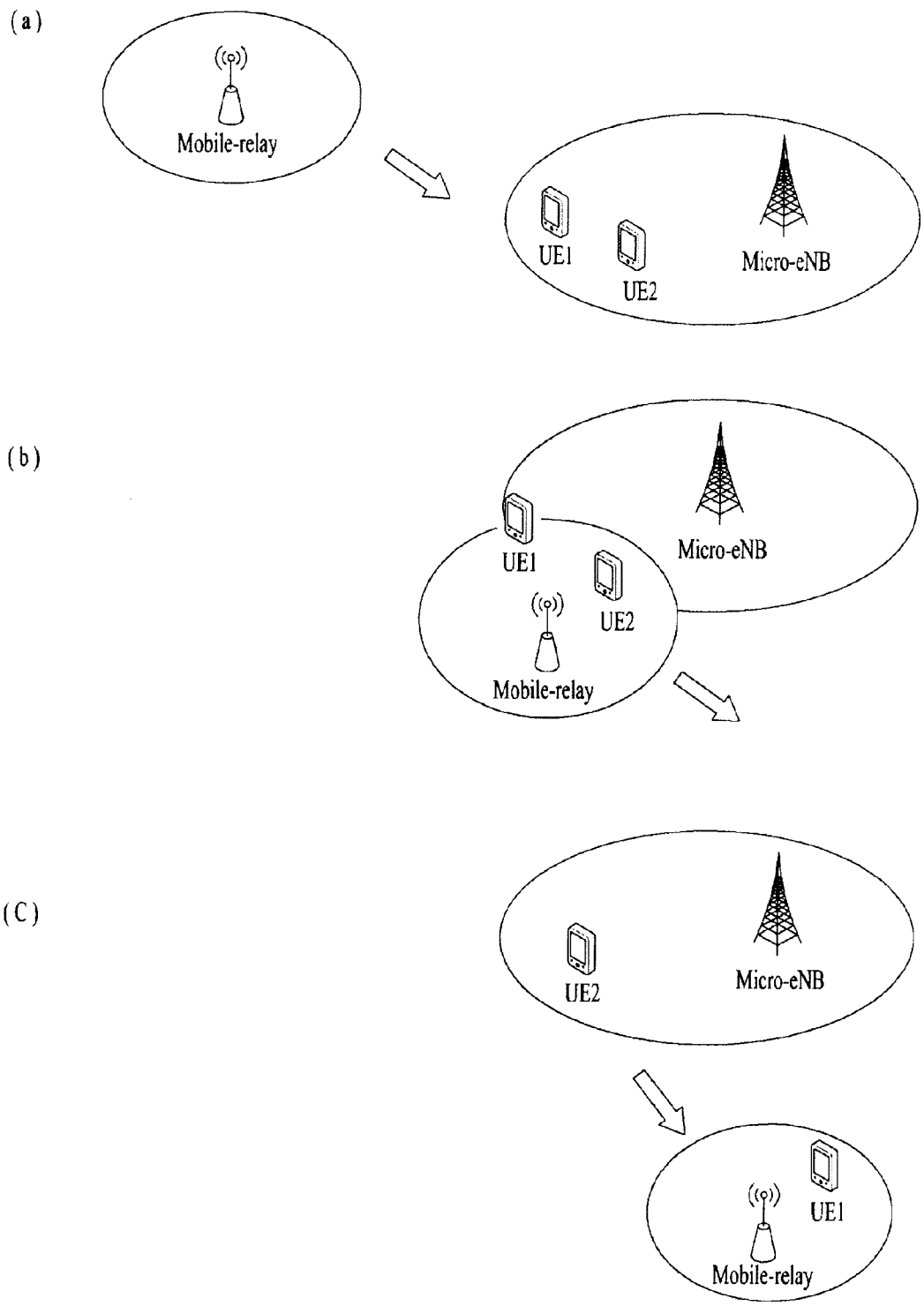
FIGS. 8 and 9 illustrate exemplary handover situations that may result from introduction of a mobile relay.
Figure 9:
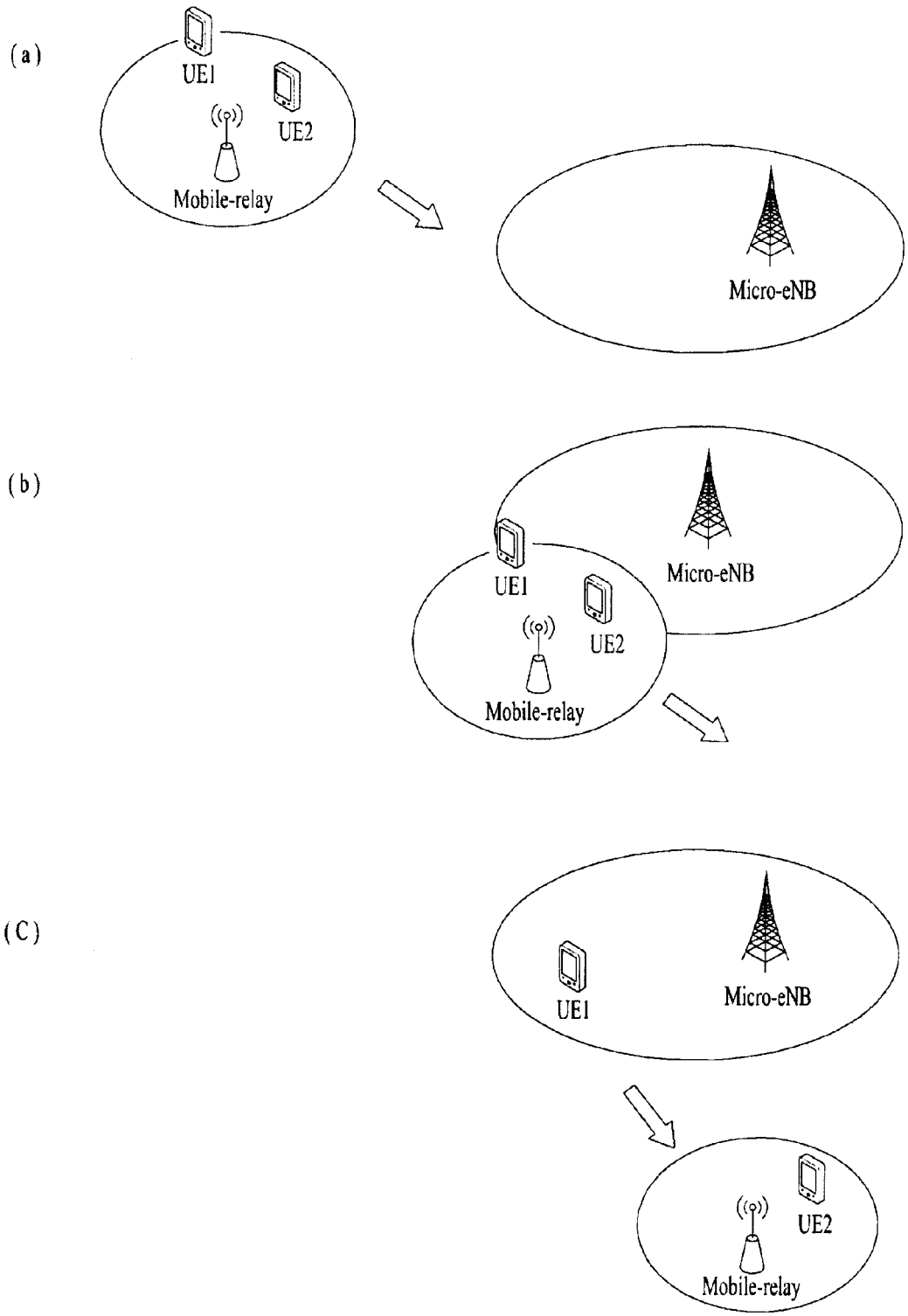

FIGS. 8 and 9 illustrate exemplary handover situations that may result from introduction of a mobile relay. For the convenience of description, it is assumed in FIGS. 8 and 9 that the mobile relay is installed in a bus and a macro eNB covers a bus stop.

FIG. 8 illustrates an exemplary handover situation in the case where UE1 and UE2 are waiting for a bus at a bus stop.

In the example of FIG. 8(a), UE1 and UE2 are served by a macro eNB and a mobile relay is moving toward UE1 and UE2.

FIG. 8(b) illustrates a situation in which the mobile relay has arrived at the location of UE1 and UE2. In this case, each of UE1 and UE2 may sense a strong signal from the mobile relay and thus may report the reception of the strong signal to the serving eNB (i.e. the macro eNB). If the serving eNB follows a conventional handover procedure that is based on received signal strength, the serving eNB may perform handover of UE1 and UE2 to the cell of the mobile relay.

FIG. 8(c) illustrates a situation in which UE1 gets on the bus but UE2 stays where it is. In this case, since UE1 gets on the bus and moves along with the mobile relay, it is appropriate that UE1 performs handover from the macro eNB to the mobile relay.

However, a signal received from the macro eNB gets stronger than a signal received from the mobile relay, for UE2 that is not aboard the bus in the example of FIG. 8(c). Therefore, UE2 will perform handover from the mobile relay to the macro eNB. In this case, handover of UE2 to the mobile relay that stays just a moment and then leaves may be unnecessary and increase network load.

FIG. 9 illustrates an exemplary handover situation, in the case where a bus carrying UE1 and UE2 arrives at a bust stop.

FIG. 9(a) illustrates a situation in which UE1 and UE2 are served by the mobile relay and the mobile relay, UE1, and UE2 are moving toward a bus stop.

FIG. 9(b) illustrates a situation in which the mobile relay, UE1, and UE2 have arrived at the bus stop. In this case, both UE1 and UE2 may sense a strong signal from the macro eNB and may report the reception of the strong signal to the serving eNB (i.e. the mobile relay). If the serving eNB follows the conventional handover procedure that is based on received signal strength, the serving eNB may perform handover of UE1 and UE2 to the cell of the macro eNB.

FIG. 9(c) illustrates a situation in which UE1 gets off the bus but UE2 leaves on the bus. In this case, since the mobile relay gets far from UE1 and UE1 is located within the coverage of the macro eNB, it is appropriate that UE1 performs handover from the mobile relay to the macro eNB.

However, as the transportation means carrying the mobile relay gets farther from the macro eNB, a signal received from the mobile relay gets stronger than a signal received from the macro eNB, for UE2 that stays on the bus in the example of FIG. 9(c). Therefore, UE2 will perform handover from the macro eNB to the mobile relay. In this case, handover of UE2 to the macro cell where UE2 stays just for a short time may be unnecessary and increase network load.

As noted from FIGS. 8 and 9, if a handover situation (e.g. a signal from an eNB other than a serving eNB is stronger than a signal from the serving eNB) is related to a mobile relay (i.e. the mobile relay is a serving eNB or a target eNB in the handover situation) in the conventional handover procedure, a predicted location of a UE needs to be considered additionally. In the disclosure, handover from a mobile relay to an eNB or handover from an eNB to a mobile relay will be referred to as 'mobile relay handover'.

For this purpose, a UE may determine whether to perform mobile relay handover by determining whether to move along with the mobile relay. Specifically, only when the UE determines whether to perform handover, taking into additional account whether the UE gets aboard a transportation means having the mobile relay, while being served by an eNB or the UE gets off the transportation means, while being served by the mobile relay, unnecessary handover operations are reduced.

Embodiment 1

In the case of mobile relay handover, a UE may notify a user of the UE of availability of the mobile relay handover, receive an input from the user (e.g. receive information indicating whether the user has gotten on or off a vehicle having a mobile relay), and transmit the user input to an eNB in an embodiment of the present invention. The eNB may determine whether to perform handover for the UE based on the received user input.

A mobile relay handover is possible, for example, when a mobile relay approaches a UE and thus the UE measures a strong signal from the mobile relay or when a UE moving along with a mobile relay approaches an eNB (e.g. a macro eNB) and thus measures a strong signal from the eNB.

Handover availability may be notified to a user in various manners. For example, the user is prompted to answer a query of whether handover to the mobile relay or handover to the eNB will be performed, a query of whether the user will get on (or has gotten on) the transportation means having the mobile relay, or a query of whether the user will get off (or has gotten off) the transportation means having the mobile relay.

If a user of a UE is aboard a transportation means having a mobile relay, this implies that a predicted traveling route of the UE is identical to a predicted traveling route of the mobile relay. Likewise, if the user gets off the transportation means, this implies that a predicted traveling route of the UE is different from a predicted traveling route of the mobile relay. In this context, the term 'get-on' or 'get-off' will be used from the viewpoint of a UE in order to describe a state of the UE briefly.

To minimize unnecessary notifications of availability of mobile relay handover, when handover is not mobile relay handover (i.e. either of a serving eNB and a target eNB is not a mobile relay in handover), handover availability may not be notified to a user. Only when a signal from an eNB other than a serving eNB is kept at or above a predetermined strength for a predetermined time or longer, the notification may be transmitted to the user.

The function of notifying the availability of mobile relay handover may be activated or deactivated directly by the user or transparently for the user according to a predetermined condition. For example, if the user stays at a stop for a transportation means for a predetermined time or longer, the function of notifying handover availability may be activated. At the moment the user is away from the stop for a predetermined time or longer, the function of notifying handover availability may be deactivated.

Embodiment 2

In another embodiment of the present invention, a user may preliminarily register identification information about mobile relays (or transportation vehicles having the mobile relays) in a UE. In the event of handover to or from a mobile relay having identification information registered to the UE, the UE may perform mobile relay handover without asking the user whether to perform handover (or asking the user whether the user has gotten on/off).

For example, identification information about a mobile relay (or identification information about a transportation means having the mobile relay) may include information about a bus line number or a subway line number (or a predicted route of a bus line or a subway line), a vehicle identification number, a mobile relay identification number (e.g. a cell ID), a traveling direction, a time, a place, etc. A cell ID may be allocated to a mobile relay such that the mobile relay is distinguished from a general eNB (e.g. a macro eNB). For example, a specific part of total IDs available as cell IDs may be defined as cell IDs for mobile relays. In this case, it may be determined whether a cell is a mobile relay cell simply by the cell ID of the cell.

The identification information about the mobile relay may be a combination of one or more pieces of identification information. For example, identification information may be configured for every vehicle of a specific line such that handover may be performed irrespective of a traveling direction, time, and place. Or identification information may be configured such that handover is performed only when a vehicle corresponds to a specific traveling direction, a specific time, and a specific place from among all vehicles of a specific line. Handover from another eNB to a mobile relay or handover from a mobile relay to another eNB may be always performed according to identification information about the mobile relay.

For example, a UE may always attempt handover to a mobile relay having identification information registered to the UE, on the assumption that the user of the UE gets on a transportation means having the mobile relay. If information about a specific time zone (e.g. a commute time zone to work) and/or information about a specific stop (e.g. a stop in the neighborhood of a user's house) is additionally set, when a mobile relay satisfying this condition approaches, the UE may always perform handover to the mobile relay.

In another example, a UE may always attempt handover from a mobile relay having identification information registered to the UE, on the assumption that the user of the UE gets off a transportation means having the mobile relay. If information about a specific time zone (e.g. a commute time zone to home) and/or information about a specific stop (e.g. a subway station in the neighborhood of a user's house) is additionally set, when a mobile relay satisfying this condition approaches another eNB, the UE may always perform handover to the eNB.

While it has been described that handover is allowed based on identification information listed in a white list, by way of example, identification information may be listed in a black list so that handover to or from mobile relays having the identification information may be prohibited. In general, handover is allowed for a mobile relay installed in a public transportation means only in some cases. Therefore, identification information may be configured in a white list.

As described before, pre-registered identification information may be changed dynamically by a user.

The identification information may be stored in the UE and/or a network. In the former case, the UE may be configured to report handover-related information (e.g. measurement information) to an eNB, only when a mobile relay matches the identification information. Therefore, unnecessary handover is not performed. In the latter case, although the UE reports handover-related information to the network (e.g. a serving eNB), the serving eNB may determine not to perform handover, if the handover-related information does not match the user-registered identification information.

A macro eNB related to handover to or from a mobile relay (e.g. a macro eNB covering a specific bus stop or a specific subway station) may prepare for authentication of the UE, to thereby shorten time taken for handover.

Embodiment 3

In another embodiment of the present invention, a UE may determine whether its user is approaching or receding from a mobile relay by means of a sensor of the UE and may perform handover to or from the mobile relay based on the determination.

For example, the UE may determine whether the user has gotten on or off a transportation means having the mobile relay by sensing a signal from a specific signal generator installed at an entrance/exit door of the transportation means through the sensor of the UE. For example, if a transportation means having a mobile relay is a bus, a UE having a bus card may determine whether its user is getting on/off the bus by near-field communication with a card reader installed in the bus. For this operation, a signal generated from the signal generator or the card reader may include identification information about the bus (e.g. line information about the bus).

If departure and arrival times are preset as is the case with a train, an aircraft, a ship, etc., the UE may determine departure and arrival times of such a transportation means by reading ticket information or receiving a readable electronic ticket. In this case, if the departure or arrival time of the transportation means comes near and thus a signal from a specific eNB gets stronger during measurement of signals from neighbor eNBs (in the case of get-on or get-off), the UE may perform handover to the eNB (i.e. mobile relay handover). Or the UE may acquire information about a departure location and a destination from the ticket information and may perform mobile relay handover at a departure or arrival time in the departure location or the destination. For example, the UE may extract destination information from the ticket information and may acquire information about an eNB located in the destination directly or indirectly through a query and response procedure with a server in a network.

While it has been described that a UE senses a user's get-on or get-off, reports the sensing to an eNB, and thus performs mobile relay handover in the above example, it may be further contemplated that a sensor installed along with a mobile relay (or a transportation means having the mobile relay) senses the UE's get-on or get-off and the network initiates a mobile relay handover procedure based on the sensing. For example, if the UE gets on the transportation means with the mobile relay, the mobile relay may serve as a target eNB and may request handover of the UE to a serving eNB. If the UE gets off the transportation means with the mobile relay, the mobile relay may serve as a serving eNB and may initiate a handover procedure to a target eNB (e.g. a macro eNB covering a place where the UE gets off the transportation means). In both cases, it is determined whether a user gets on/off without intervention of the user and mobile relay handover is performed based on the determination.

Embodiment 4

The forgoing embodiments of mobile relay handover, specifically an embodiment of receiving a user input indicating whether a user gets on or gets off a transportation means having a mobile relay (Embodiment 1), an embodiment of assuming that a user gets on or gets off a transportation means having a mobile relay whose identification information has been registered to a UE (Embodiment 2), and/or an embodiment of sensing a user's get-on or get-off (Embodiment 3) may be used as information that triggers an operation other than handover.

For example, if it is determined that a user is aboard a transportation means with a mobile relay, a UE may switch call termination from a bell mode to a vibration mode or may execute an application that provides line information about the transportation means. In addition, the UE may acquire information about the location of the transportation means and information about an expected time to a destination in the transportation means by exchanging signals with communication equipment such as the mobile relay. The UE may further notify the user whether the destination is near based on the acquired information.

If the UE determines that the user has gotten off the transportation means with the mobile relay, the UE may switch from an aboard operation mode to a normal operation mode set before being aboard.

Figure 10:
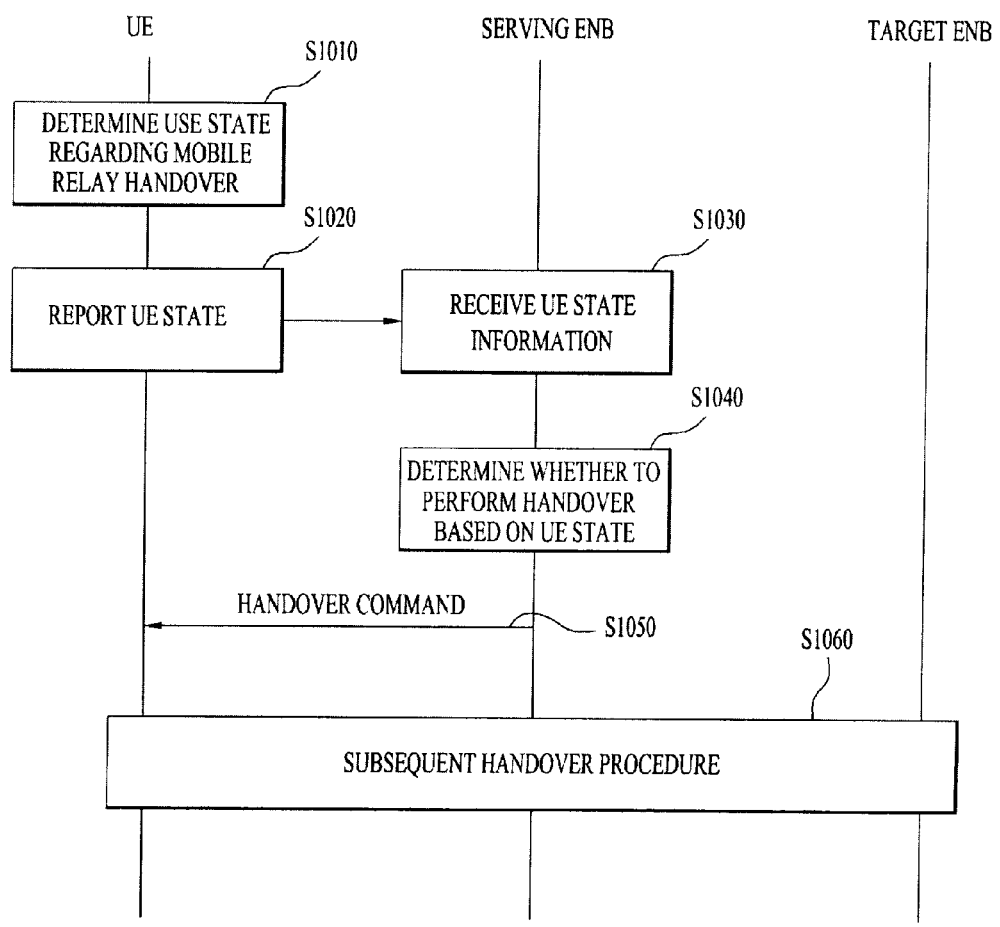
FIG. 10 illustrates a signal flow for a method for performing mobile relay handover according to the present invention.

FIG. 10 illustrates a signal flow for a method for performing mobile relay handover according to the present invention.

In the illustrated case of FIG. 10, a serving eNB may be a mobile relay and a target eNB may be a macro eNB, or a serving eNB may be a macro eNB and a target eNB may be a mobile relay. Handover related to a mobile relay is called mobile relay handover, as stated before.

A UE may determine its state in relation to handover (S1010). Briefly speaking, the state of the UE may be a state in which mobile relay handover is allowed or not allowed. Specifically, the UE may be placed in a first state where the mobile relay and the UE are in the same predicted traveling route (e.g. when the user of the UE will get on/has gotten on a transportation means having the mobile relay) or in a second state where the mobile relay and the UE are in different predicted traveling routes (e.g. when the user of the UE will get off/has gotten off the transportation means having the mobile relay).

The state of the UE may be determined according to the foregoing various embodiments (e.g. a user input, preset identification information, and UE's sensing) in step S1010.

The UE may transmit information indicating the determined state in relation to mobile relay handover to the serving eNB (S1020). The serving eNB may receive the information (S1030). The UE may transmit the state information together with or separately from a measurement of a neighbor eNB (e.g. in step S110 of FIG. 7) in step S1020.

The serving eNB may determine whether to perform the UE's handover based on the state information in relation to the mobile relay handover, received from the UE (S1040). For example, in the case where the serving eNB is a macro eNB and the target eNB is a mobile relay, the serving eNB may determine to approve handover if the UE and the mobile relay travel in the same predicted route and may determine not to approve handover if the UE and the mobile relay travel in different predicted routes. Or in the case where the serving eNB is a mobile relay and the target eNB is a macro eNB, the serving eNB may determine not to approve handover if the UE and the mobile relay travel in the same predicted route and may determine to approve handover if the UE and the mobile relay travel in different predicted routes.

The serving eNB may transmit a handover command to the UE based on the determination as to handover (S1050). If the serving eNB determines to approve the handover, a procedure for securing resources for the UE may be performed at the target eNB before step S1050 (e.g. steps S120 and S130 in FIG. 7). If the serving eNB determines not to approve the handover, step S1050 may not be performed.

The UE that has received the handover command, the serving eNB, and the target eNB may perform a subsequent operation of the handover procedure (e.g. steps S150 to S190 in FIG. 7) (S1060).

To perform mobile relay handover according to the present invention, the foregoing embodiments may be implemented independently or two or more of them may be implemented in combination. For clarity, a redundant description will be avoided herein.

Figure 11:
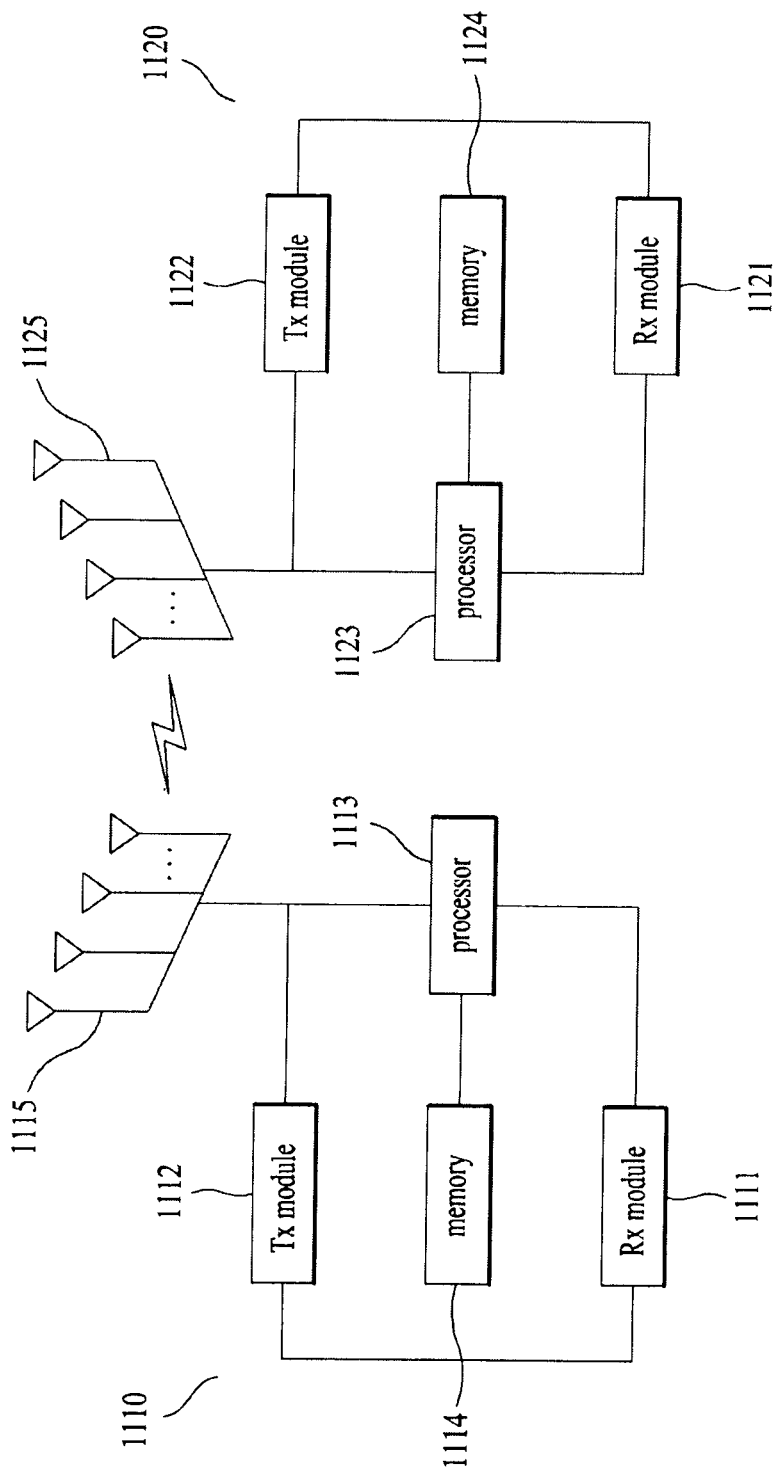
FIG. 11 is a block diagram of a User Equipment (UE) and an evolved Node B (eNB or eNode B) according to the present invention.

FIG. 11 is a block diagram of a UE and an eNB according to the present invention.

Referring to FIG. 11, a UE 1110 may include an Rx module 1111, a Tx module 1112, a processor 1113, a memory 1114, and a plurality of antennas 1115. The UE 1110 supports MIMO transmission and reception through the plurality of antennas 1115. The Rx module 1111 may receive signals, data, and information from another device (e.g. an eNB or an RN). The Tx module 1112 may transmit signals, data, and information to another device. The processor 1113 may provide overall control to the UE 1110.

The UE 1110 may be configured to perform mobile relay handover. The processor 1113 of the UE 1110 may be configured to report information about the state of the UE in relation to the mobile relay handover to a serving eNB. The processor 1113 may also be configured to perform the mobile relay handover based on a handover command received from the serving eNB, as determined based on the state of the UE by the serving eNB.

Besides, the processor 1113 of the UE 1110 may process information received at the UE or information to be transmitted from the UE. The memory 1114 may store processed information for a predetermined time and may be replaced with a component such as a buffer (not shown).

Referring to FIG. 11, an eNB 1120 may include an Rx module 1121, a Tx module 1122, a processor 1123, a memory 1124, and a plurality of antennas 1125. The eNB 1120 supports MIMO transmission and reception through the plurality of antennas 1125. The Rx module 1121 may receive signals, data, and information from another device (e.g. a UE, another eNB, or an RN). The Tx module 1122 may transmit signals, data, and information to another device. The processor 1123 may provide overall control to the eNB 1120.

The eNB 1120 may be configured to support mobile relay handover. The processor 1123 of the eNB 1120 may be configured to receive information about the state of a UE in relation to mobile relay handover from the UE. The processor 1123 may also be configured to determine the mobile relay handover based on the state of the UE and transmit a handover command to the UE.

The eNB 1120 of FIG. 11 may be another eNB involved in the mobile relay handover or may be a mobile relay.

Besides, the processor 1123 of the eNB 1120 may process information received at the eNB 1120 or information to be transmitted from the eNB 1120. The memory 1124 may store processed information for a predetermined time and may be replaced with a component such as a buffer (not shown).

The above UE and eNB may be configured to implement the foregoing embodiments independently or two or more of them in combination. For clarity, a redundant description will be avoided herein.

The description of an eNB in FIG. 11 may apply to an RN as a DL transmission entity or a UL reception entity, and the description of a transmission and reception apparatus in FIG. 11 may apply to a UE or an RN as a DL reception entity or a UL transmission entity.

The embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSP), Digital Signal Processing Devices (DSDPs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

The invention claimed is:

1. A method for performing a mobile relay handover at a user equipment, the method comprising:
   reporting information about a state of the user equipment regarding the mobile relay handover to a serving base station; and
   performing the mobile relay handover based on a handover command received from the serving base station, the handover command being determined based on the state of the user equipment by the serving base station,
   wherein the state of the user equipment is determined based on at least one of information input by a user of the user equipment, identification information preset in the user equipment, and a sensing result of the user equipment, and
   wherein the preset identification information includes at least one of information about a predicted travel route of the mobile relay, identification information about the mobile relay, identification information about a transportation means in which the mobile relay is installed, time information, and place information.

2. The method according to claim 1, wherein the state of the user equipment is one of a first state in which the user equipment and a mobile relay travel in the same predicted route and a second state in which the user equipment and the mobile relay travel in different predicted routes.

3. The method according to claim 2, wherein if the mobile relay handover is a handover from the mobile relay to another base station, the mobile relay handover is not performed when the state of the user equipment is the first state and the mobile relay handover is performed when the state of the user equipment is the second state.

4. The method according to claim 2, wherein if the mobile relay handover is a handover from another base station to the mobile relay, the mobile relay handover is performed when the state of the user equipment is the first state and the mobile relay handover is not performed when the state of the user equipment is the second state.

5. The method according to claim 1, wherein the information input by the user of the user equipment is a response to a request for confirming the state of the user equipment.

6. The method according to claim 1, wherein the sensing result of the user equipment is at least one of a result of sensing a signal from the mobile relay or a device co-located with the mobile relay and a result of sensing a medium containing information about at least one of a predicted travel route, a departure time, a departure location, an arrival time, and an arrival location of the mobile relay.

7. The method according to claim 1, wherein the mobile relay handover is a handover from the mobile relay to another base station or a handover from another base station to the mobile relay.

8. A method for supporting a mobile relay handover, the method comprising:
receiving information about a state of a user equipment regarding the mobile relay handover; and
determining whether the mobile relay handover is to be performed based on the state of the user equipment and transmitting a handover command to the user equipment,
wherein the state of the user equipment is determined based on at least one of information input by a user of the user equipment, identification information preset in the user equipment, and a sensing result of the user equipment, and
wherein the preset identification information includes at least one of information about a predicted travel route of the mobile relay, identification information about the mobile relay, identification information about a transportation means in which the mobile relay is installed, time information, and place information.

9. A user equipment for performing a mobile relay handover, the user equipment comprising:
a transmission module for transmitting a signal to a network;
a reception module for receiving a signal from the network; and
a processor for controlling the user equipment including the transmission module and the reception module,
wherein the processor is configured to report information about a state of the user equipment regarding the mobile relay handover to a serving base station through the transmission module, and to perform the mobile relay handover based on a handover command received from the serving base station, the handover command being determined based on the state of the user equipment by the serving base station,
wherein the state of the user equipment is determined based on at least one of information input by a user of the user equipment, identification information preset in the user equipment, and a sensing result of the user equipment, and
wherein the preset identification information includes at least one of information about a predicted travel route of the mobile relay, identification information about the mobile relay, identification information about a transportation means in which the mobile relay is installed, time information, and place information.

10. A base station for supporting a mobile relay handover, the base station comprising:
a transmission module for transmitting a signal to a user equipment;
a reception module for receiving a signal from the user equipment; and
a processor for controlling the base station including the transmission module and the reception module,
wherein the processor is configured to receive information about a state of the user equipment regarding the mobile relay handover through the reception module, to determine whether the mobile relay handover is to be performed based on the state of the user equipment, and to transmit a handover command to the user equipment through the transmission module,
wherein the state of the user equipment is determined based on at least one of information input by a user of the user equipment, identification information preset in the user equipment, and a sensing result of the user equipment, and
wherein the preset identification information includes at least one of information about a predicted travel route of the mobile relay, identification information about the mobile relay, identification information about a transportation means in which the mobile relay is installed, time information, and place information.

* * * * *